INVENTORS
Walter E. Sargeant &
BY James E. Wilson

R. L. Spencer
ATTORNEY

Aug. 23, 1966       W. E. SARGEANT ETAL       3,268,042
TEMPERATURE SENSITIVE FAN DRIVE CLUTCH CONTROL
Filed June 20, 1963                           2 Sheets-Sheet 2

INVENTORS
Walter E. Sargeant &
BY James E. Wilson

R. L. Spencer
ATTORNEY

United States Patent Office 3,268,042
Patented August 23, 1966

3,268,042
TEMPERATURE SENSITIVE FAN
DRIVE CLUTCH CONTROL
Walter E. Sargeant, Clawson, and James E. Wilson,
St. Clair Shores, Mich., assignors to General
Motors Corporation, Detroit, Mich., a corporation
of Delaware
Filed June 20, 1963, Ser. No. 289,270
14 Claims. (Cl. 192—84)

This invention relates to a fan drive for a vehicle engine cooling system and more particularly to an automatically operable temperature sensitive clutch control for engaging and releasing a friction fan drive clutch in accordance with the cooling requirements of an engine.

It is well known that conventional fan drives, wherein the engine cooling fan is continuously driven, needlessly waste engine horsepower, result in excess engine cooling, particularly during engine warm up periods and during cold weather operation, and cause undesirable fan noise due to drive of the fan during periods in which fan cooling is not required.

While temperature responsive fan drives have heretofore been proposed, this invention provides a very compact friction clutch drive arrangement wherein very little energy is required to engage the clutch and wherein the clutch, when engaged, provides very high torque transmitting capacity.

An object of this invention is to provide a novel friction clutch of high torque transmitting capacity capable of engagement with as little engaging force as may be provided by a temperature responsive magnet.

Another object of this invention is to provide a high capacity friction fan drive clutch and clutch control incorporating a permanent magnet and a temperature responsive magnetic shunt for controlling the engagement and release of the friction clutch.

A further object of this invention is to provide in an engine cooling system a fan drive clutch comprising a coil spring clutch and a temperature sensitive control for engaging and releasing the coil spring clutch in response to cooling requirements of the engine.

A more particular object of this invention is to provide in an engine cooling system an engageable and releasable coil spring clutch effective when engaged to drive an engine cooling fan and a temperature responsive clutch control incorporating a permanent magnet and a magnetic shunt ring wherein the curie point of the permanent magnet is above the temperature range normally encountered in operation of an engine and a magnetic shunt ring having a curie point falling within the range of temperatures normally encountered in operation of the engine.

An additional object of this invention is to provide a fan drive clutch for driving a cooling fan incorporating a coil spring clutch adapted to be engaged and released and a temperature responsive control mechanism incorporating a permanent magnet ring having a relatively high curie point, for example, in the range of 350°–1100° F. and having characteristics such that the saturation flux density changes little over this wide range of temperatures and incorporating a magnetic shunt ring having a relatively low curie point, for example, 150° F., and having characteristics such that its flux density will change from maximum to a minimum of nearly zero in a narrow range of temperature, for example 10° F.

A specific object of this invention is to provide an engageable and releasable coil spring clutch effective when engaged, to drive a fan in an engine cooling system wherein the coil spring clutch has a free end acted upon by magnetic means for engaging and releasing the clutch.

A further object of this invention is to provide an engageable and releasable coil spring clutch for driving and releasing an engine cooling fan wherein a permanent magnet and magnetic shunt are disposed in operative relation to a free end of the coil spring clutch for initiating engagement and release of the clutch and wherein the curie point of the permanent magnet is higher than the highest temperature normally encountered in the engine cooling system and wherein the curie point of the magnetic shunt ring falls within the normal range of temperatures encountered in operation of the engine.

These and other objects and advantages of the invention will be apparent from the following specification and claims, taken in conjunction with the accompanying drawings in which:

Figure 1:
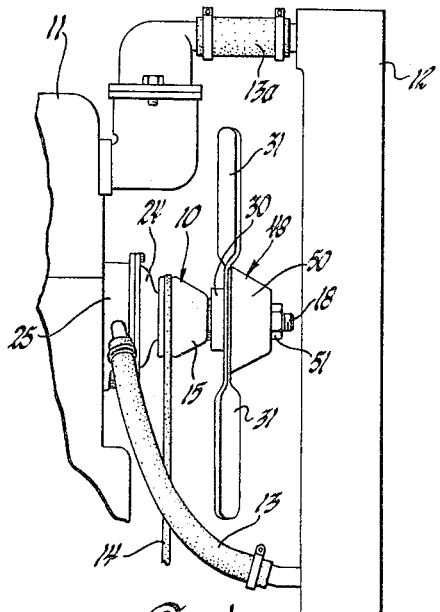
FIGURE 1 is a fragmentary side elevation of an engine cooling system provided with a fan drive clutch and clutch control constructed in accordance with the principles of this invention.

Referring to FIGURE 1, there is shown an engine cooling system incorporating a fan drive constructed in accordance with the principles of this invention. A fan drive assembly 10 is positioned between an internal combustion engine 11 and a radiator 12 for driving cooling air through the radiator and back over the engine. The radiator 12 is connected to the engine through conventional hose connections 13 and 13a. A pulley 15 is continuously driven by engine 11 by means of a belt 14.

Figure 2:
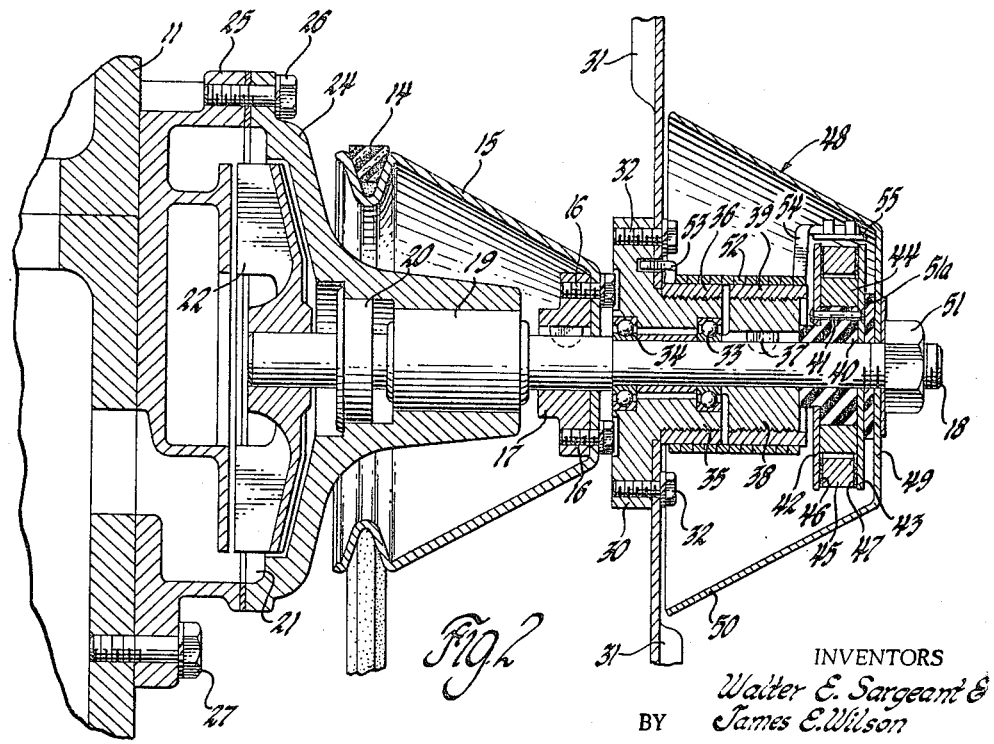
FIGURE 2 is a sectional view of one embodiment of the invention.

Referring to FIGURE 2, pulley 15 is bolted to a drive hub 17 by bolts 16, the drive hub being keyed to shaft 18 for driving the same. Shaft 18 is rotatably supported in a water pump housing 24 by means of a suitable bearing 19. A seal 20 prevents loss of fluid from a pump chamber 21 through bearing 19. A water pump impeller 22 in chamber 21 is continuously driven by shaft 18 whenever the engine 11 is operating. Water pump housing section 24 is bolted to a second housing section 25 by bolts 26, the section 25 in turn being bolted to engine 11 by means of bolts 27.

Shaft 18 extends outwardly from pump housing 24 to support a fan hub 30 having fan blades 31 secured thereto by bolts 32. A pair of spaced roller bearings 33 and 34 support hub 30 for rotation with respect to shaft 18. A dry friction sleeve 36 is press fitted onto an axially extending cylindrical boss portion 35 or extension of hub 30. In mounting friction sleeve 36 on hub 30, a heavy knurl is formed on the external surface of boss 35, sleeve 36 is pressed onto the knurl and the external cylindrical surface of sleeve 36 is finish-machined to provide a smooth external friction surface. Disposed coaxial with and adjacent boss 35 is a drive hub 38 keyed to shaft 18 for rotation therewith by means of a key 37. A drive sleeve 39 is press fitted to drive hub 38, the sleeve 39 being machined to provide a smooth cylindrical friction surface. Sleeves 36 and 39 are formed of non-magnetic material such as brass, nylon, Teflon, Bakelite or Babbitt.

Disposed axially outwardly from hub 38 is a spacer or hub 40 formed of Bakelite or other non-magnetic material, the hub 40 being rotatable as a unit with shaft 18. A pair of upstanding armatures or discs 42 and 43 are secured to hub 40 by means of suitable rivets 41. The spaced armatures 42 and 43 form an annular channel therebetween for receiving a permanent ring-shaped magnet 44 and a magnetic shunt ring 45. Armatures 42 and 43 are formed of soft steel and constitute pole piece rings capable of conducting magnetic flux. Shunt ring 45 is secured to the outer portion of the pole discs 42, 43 by means of thin paper gaskets 46 and 47 of the order of one-hundredth of an inch maximum thickness, the gaskets being bonded both to the pole rings and the shunt ring by means of a suitable adhesive. A cover 48 has a cone shaped extension 50 extending rearwardly to the vicinity of fan blades 31 and a hub portion 49 secured to shaft 18 by means of a nut 51. A Bakelite spacer washer 51a maintains hub 49 in spaced relation to armature ring 43 and prevents loss of magnetic flux to the cover.

A coil clutch spring 52 of rectangular cross section has a series of coils extending axially along friction sleeves 36 and 39 and adapted to contact the friction surfaces of sleeves 36 and 39 or be released from such surfaces. One end 53 of spring 52 extends through suitable openings in fan blade 31 and hub 30 such that spring 52 rotates with fan 31 at all times. A free end 54 of spring 52 has a soft steel plate 55 secured thereto and normally spaced radially outwardly from the outer ends of pole discs 42 and 43 in concentric relationship therewith, to provide an air gap between the outer ends of poles 42 and 43 and member 55.

Permanent magnet ring 44 is formed of magnetic material having a curie point higher than the highest temperature to which it will be subjected during operation of the engine and has characteristics such that its flux density remains substantially constant over a wide range of temperatures, for example, between 350 and 1100 degrees Fahrenheit. In contrast to this, the magnetic shunt ring 45 is formed of material having a relatively low curie point which falls within the normal range of temperature at which it is desirable to operate the engine, for example, 160 degrees Fahrenheit. In addition, the flux density of shunt ring 45 changes from a maximum to a minimum in a very narrow temperature range of from 5 to 10 degrees as the temperature of the shunt is raised to approach its curie point. The curie point may be defined as the temperature at which a ferromagnetic material becomes substantially nonmagnetic.

In the operation of automotive engines it is common practice to use a thermostat to control the flow of hot coolant from the engine to the radiator to maintain the engine temperature at a sufficiently high temperature to provide efficient engine operation, for example, 175 to 180 degrees Fahrenheit. The temperature of coolant entering the radiator is rapidly cooled by radiator action and reenters the engine at a temperature of about 150 degrees Fahrenheit. The radiator and fan are designed to have sufficient capacity to maintain such a differential in cooling temperature.

Under certain operating conditions it is advantageous that the fan should not be driven and that cooling results from operation of the water pump and radiator alone. For example, fast engine warm up from a cold start reduces "choke" time and consequent oil dilution in the engine crankcase. Again, when operating on an open highway in cold or moderate temperatures, the ram effect of the vehicle in motion will often provide sufficient air flow through the radiator to accomplish adequate cooling without driving the fan. By declutching the fan under these conditions engine horsepower consumed in driving the fan and fan noise are eliminated. It is only when the radiator itself is inadequate to provide sufficient cooling that the fan need be driven.

Figure 4:
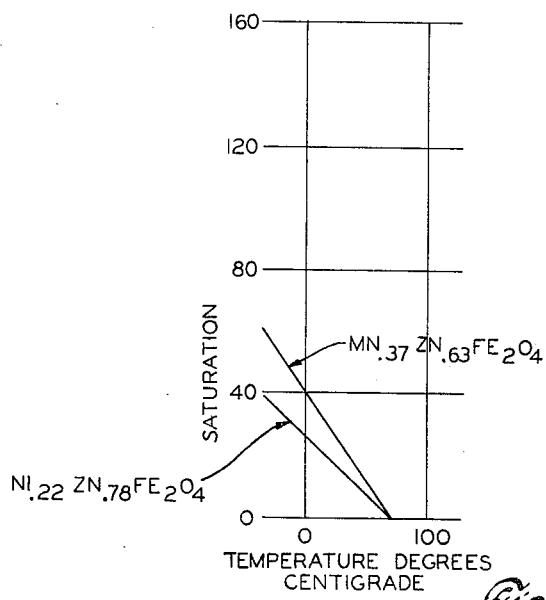
FIGURE 4 is a graph illustrating the saturation flux curve of two materials suitable for use in the magnetic shunt.

In FIGURE 4 there is shown a pair of graphs of two materials having curie points and curves of saturation flux which are satisfactory for use in a shunt ring for controlling engagement and release of the coil spring clutch in the present application. These materials are $Mn_{.37}, Zn_{.63}, Fe_2O_4$ and $Ni_{.22}, Zn_{.78}, Fe_2O_4$, respectively. The subscripts indicate the relative parts by weight of the combinations forming the above ferrites. Both the manganese zinc ferrite and nickel zinc ferrite have a curie point of approximately 150 degrees Fahrenheit or 68 degrees centigrade. The flux satauration curve for each material drops rapidly in the range between zero degrees centigrade (32° F.) and 68° C. as shown.

In operation, assuming the engine is cold, the best flux path for magnetic flux from pole piece 43 to pole piece 42 is through the shunt ring 45 so that very little magnetic flux passes through the air gap to the plate 55. The coil spring 52 will be in its released position wherein the coils of the spring are slightly spaced from and do not grip the friction surfaces of sleeves 36 and 39. Whenever the free end 54 of the coil spring is not restrained the inherent resiliency of the coils of spring 52 will cause the spring to expand so that the coils do not grip the sleeves. The fan hub 30, therefore, will not be driven by hub 38. In addition, free rotation of hub 30 due to air flow through fan blades 31 due to ram effect will tend to turn the coil spring in a direction to expand the coils such that the coils are out of contact with the friction sleeves, to release the clutch.

With continued vehicle operation and rise of temperature of the air passing through the radiator and over the magnetic shunt ring, the ring 45 will be heated to a temperature above its curie point, whereupon the shunt ring will become practically nonconductive of magnetic flux imposed upon the armatures 42 and 43 by permanent magnet ring 44. The curie point of magnet 44 is above the temperatures encountered in operation of the vehicle so that the magnet 44 remains effective to magnetize the pole rings 42 and 43. Upon rise of temperature of shunt ring 45 to a temperature above its curie point, the magnetic flux jumps the air gap and becomes effective upon member 55, drawing the member 55 into contact with the outer extremity of the poles 42 and 43. Since the armatures are driven at engine speed and faster than the fan, the free end 54 of the coil spring is wound in a direction to cause the coils of the spring to grip the friction surfaces of sleeves 39 and 36.

Very little magnetic force is required to cause engagement of the spring coils. The magnetic arrangement does not drive the fan directly but merely acts as a control relay on the spring to initiate engagement of the spring to the sleeves 39 and 36. The torque load is all carried by spring 52. It will readily be understood that once the spring coils begin to engage sleeve 39, completion of engagement of the coils to sleeve 39 and sleeve 36 will automatically occur, since sleeve 39 initially rotates faster than sleeve 36 and due to friction contact of any one coil on sleeve 39 the spring will have torsion applied thereto tending to wind up or tighten the coils. As a result of this self-wrapping of the coils on the sleeves, it is only necessary for the magnet to apply sufficient force to the free end of the spring to initiate contact of one of the spring coils to sleeve 39. Thus a small magnetic force may be employed to control engagement of a clutch having high torque transmitting capacity. This arrangement permits the use of a relatively small magnet and shunt ring as is desirable both from the standpoint of rotational forces and space requirements. The primary engaging force comes from shaft 18 and the self-wrapping effect of the coil spring.

Figure 3:
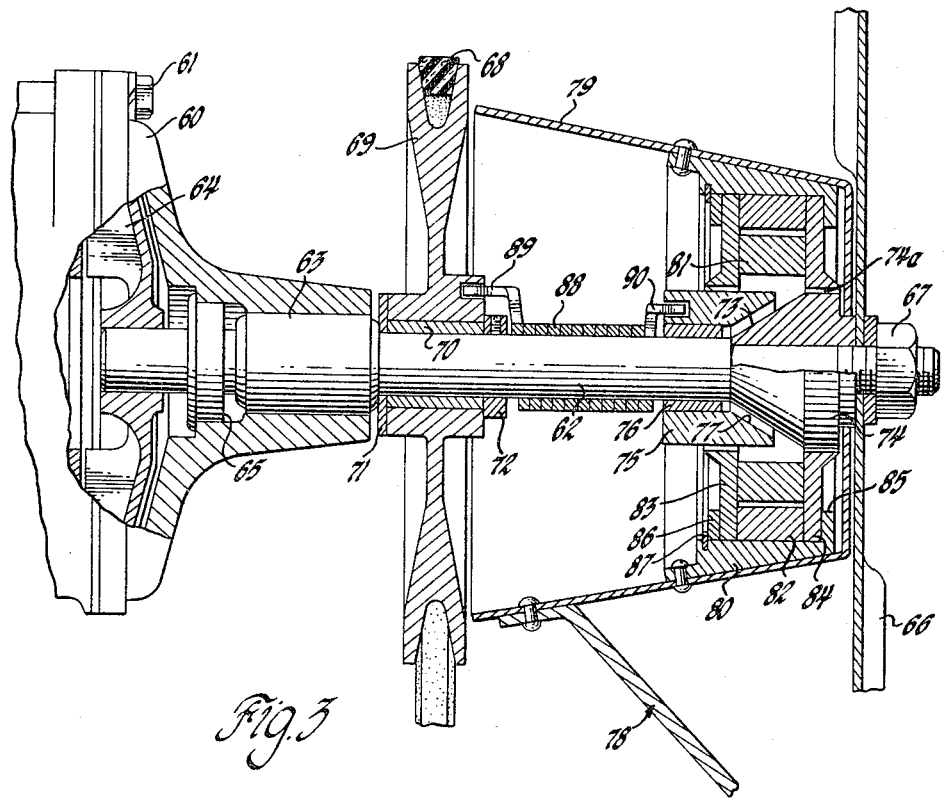
FIGURE 3 is a sectional view through a second embodiment of the invention.

Referring to FIGURE 3, there is shown an alternate design of a magnetically controlled coil spring clutch. A pump housing 60 bolted to the engine by bolts 61 rotatably supports a fan and water pump drive shaft 62 by means of a bearing 63. A water pump 64 is fixed to shaft 62 for rotation therewith and a seal 65 prevents leakage of fluid from the pump chamber along the shaft, a fan 66 is fixed to shaft 62 for rotation therewith by means of a nut 67. In this embodiment the control relay is stationary and the coil spring clutch element is continuously rotated by the engine. A pulley 69, driven from the engine by a belt 68 is rotatably supported on shaft 62 by means of a bushing 70. A washer 71 contacting the end of bearing 63 and a lock ring 72 retain the pulley in a fixed position on shaft 62. One end of shaft 62 has mounted thereon for rotation therewith a member having an enlarged conical surface 73 and an enlarged cylindrical surface 74. A soft iron armature 75 is supported on shaft 62 for axial motion on the shaft by means of a sleeve bearing 76, the armature having a conical surface 77 adapted, at times, to contact conical surface 73. A fixed mounting bracket 78 includes a cone-shaped cover 79 extending rearwardly from the vicinity of fan 66 for protective purposes and also serves to support the control relay mechanism in a stationary position. A support ring 80 fixed to cover 79 supports permanent magnet 81 in the form of a ring, a magnetic shunt ring 82 and pole rings 83 and 84. A flange 85 on support ring 80 and a washer 86 held in place by a snap ring 87 retain the assembly in assembled relationship. Pole rings 83 and 84 are slightly spaced from cylindrical surface 74 and from the outer cylindrical surface of armature 75 to provide a commutator gap between the pole discs 84 and surface 74 and between pole piece 83 and the outer cylindrical surface of armature 75, respectively.

A coil spring clutch 88 has the coils thereof extending around shaft 62 with one end 89 of the spring extending into the hub of pulley 69 and the other end 90 extending into armature 75. When the clutch is released the cone surface 77 of armature 75 will be slightly spaced from cone surface 73 of shaft 62 and spring 88 and armature 75 are driven by pulley 69.

When the engine is cold, shunt ring 82 is effective to shunt magnetic flux from permanent magnet 81 so that the flux is not effective on armature 75. Upon rise of temperature of shunt ring 82 to a temperature above its curie point, magnetic flux impressed on pole discs 83 and 84 jumps the flux commutator gap 74a and acts upon armature 75 causing axial motion of the armature with respect to shaft 62 such that conical surface 73 is contacted by conical surface 77. This surface contact places a drag on the free end 90 of spring 88. Since the end 89 is driven at a faster speed than end 90 during clutch engaging action, the coil spring tightens on shaft 62 due to its self winding effect. Here, again, the primary energy for engaging the clutch comes from the engine through pulley 69. Very little magnetic energy is required since the magnets merely act as a relay to initiate clutch engagement. This provides a clutch of high torque transmitting capacity with small energizing means for initiating engagement and release of the clutch.

While electromagnetic clutches have heretofore been proposed for engaging and releasing friction clutches, such arrangements are disadvantageous in that they require a power source, electric wiring, brushes, and consume power. The structure wherein a coil spring clutch capable of transmitting large torques and controlled in the manner set forth herein is believed novel.

We claim:

1. In a cooling system, a rotatable member, a fan driven by said rotatable member, a power input member, clutch means for alternately clutching said power input member to said rotatable member and declutching said power input member from said rotatable member including friction clutch elements, means connecting one friction clutch element to one of said members for rotation therewith and another friction clutch element to another of said members for rotation therewith and mounting said friction clutch elements for relative movement between clutched and declutched positions, temperature responsive control means coacting with said friction clutch means for controlling relative movement of said friction elements between said clutched and declutched positions, said control means including a permanent magnet having a curie point higher than the highest temperature normally encountered in operation of the cooling system and a magnetic shunt having a curie point falling within the temperature range normally encountered in operation of the cooling system, said shunt being positioned in shunt relation to said permanent magnet and being effective to shunt said permanent magnet at temperatures below the curie point of said shunt for releasing said friction clutch elements and effective at temperatures above the curie point of said shunt to render said permanent magnet effective to engage said friction clutch elements.

2. In a cooling system, a rotatable member, a fan driven by said rotatable member, a power input member, a coil spring clutch for alternately clutching said power input member to and declutching said power input member from said rotatable member, means connecting said coil spring clutch to one of said members for rotation therewith, temperature responsive magnetic control means operatively connected to said coil spring clutch for initiating engagement and release of said coil spring clutch with the other member including a permanent magnet and a temperature responsive magnetic shunt, said shunt being effective in a predetermined temperature range to render flux from said permanent magnet ineffective to initiate engagement of said clutch and effective at temperatures higher than said predetermined temperature range to render magnetic flux from said permanent magnet effective upon said coil spring clutch to initiate engagement of said clutch, the coils of said coil spring being automatically effective to complete engagement of said clutch in response to self winding of the coils of said clutch upon initiation of clutch engaging action by said magnetic flux.

3. In an engine vehicle cooling system, a rotatable member, a fan fixed to said rotatable member for rotation therewith, an engine driven power input member, clutch means for alternately clutching said rotatable member to and declutching said rotatable member from said power input shaft comprising a coil spring clutch, said clutch being connected to one of said members for rotation therewith and having the coils thereof extend around at least one of said members, temperature responsive means for controlling engagement and release of said coil spring clutch, said control means including a permanent magnet and a tempearture responsive magnetic shunt, said shunt being effective at temperatures below a predetermined temperature to present a path for magnetic flux across said permanent magnet to thereby render flux from said permanent magnet ineffective to initiate engagement of said clutch, said shunt being effective at temperatures above said predetermined temperature to block flow of flux therethrough to thereby render flux from said permanent magnet effective upon said coil spring clutch to initiate engagement of said clutch, said coil spring clutch being effective to complete engagement thereof due to self wrapping action thereof.

4. In a vehicle engine cooling system, a rotatable member, a fan fixed to said engine for rotation therewith, an engine driven power input member, a coil spring clutch for alternately clutching said power input member to and declutching said power input member from said rotatable member, said coil spring clutch having the coils thereof extending around at least said rotatable member and adapted to engage said rotatable member to transmit torque to said rotatable member, said coil spring clutch having one end thereof fixed to one of said members and a free end thereon, temperature responsive control means for controlling engagement and release of said clutch including a permanent magnet and a temperature responsive magnetic shunt, said shunt having a curie point falling within the range of temperatures normally encountered in operation of the engine, said permanent magnet having a curie point higher than the temperatures normally encountered in operation of the engine, said shunt being effective at temperatures below its curie point to render magnetic flux from said permanent magnet ineffective upon the free end of said coil spring clutch to prevent engagement of said clutch, said shunt being effective at temperatures above its curie point to block flow of flux therethrough, the flux from said permanent magnet being effective on the free end of said spring to initiate engagement of said clutch when the temperature of said shunt is higher than the curie point of said shunt.

5. In a vehicle engine cooling system, a fan for cooling said engine, an engine driven power input member, a rotatable member supporting said fan, a coil spring clutch adapted to clutch said members to each other, said coil spring clutch having one end thereof fixed to one of said members and a free end freely rotatable, automatically operable temperature controlled means for controlling engagement and release of said coil spring clutch including a permanent magnet ring and a temperature responsive shunt, said shunt being formed of temperature sensitive material having a curie point falling within the normal range of temperatures encountered in normal operation of said engine, said permanent magnet ring being formed of magnetic material having a curie point higher than the highest temperature normally encountered in operation of said engine, said magnetic shunt providing a path for conducting magnetic flux from pole to pole of said magnet ring at shunt temperatures below said shunt curie point to release said clutch, said shunt blocking flow of magnetic flux through said shunt at shunt temperatures above the curie point of said shunt to render the magnetic flux effective upon the free end of said coil spring to engage said coil spring clutch.

6. In a vehicle engine cooling system, a fan unit for cooling said engine including a rotatable member, an engine driven member adapted to alternately be clutched to and declutched from said rotatable fan member, a coil spring clutch for alternately clutching said fan member to and declutching said fan member from said engine driven member, said coil spring clutch having one end thereof fixed to one of said members for rotation therewith and a free end, magnetic means cooperating with said free end for controlling engagement and release of said clutch, said magnetic means including a permanent magnet and a temperature responsive shunt ring effective in a predetermined range of temperatures to present a first flux path for flow of flux from one pole to another pole of said magnet, said shunt ring being effective at temperatures above said predetermined temperature range to block flow of flux therethrough, the magnetic flux from said permanent magnet being effective at such elevated temperatures to place a magnetic force on said free end of said coil spring clutch to engage said clutch.

7. In a vehicle engine cooling system, a power input shaft driven by said engine, a fan hub supported on said shaft for rotation with respect thereto, fan blades on said hub, a drive hub driven by said shaft, temperature responsive clutch control means driven by said shaft, said control means including a permanent magnet and a temperature responsive magnetic shunt, a pair of spaced pole discs rotatable with said permanent magnet, a coil spring clutch having the coils thereof extending around both of said hubs and adapted to alternately engage and be released from said hubs, means connecting said coil spring to one of said hubs, said coil spring having a free end disposed in close proximity to said clutch control means, said shunt and said permanent magnet being disposed between said pole discs, said shunt having a curie point falling within the normal range of temperatures normally encountered in operation of said engine and said permanent magnet having a curie point higher than the normal range of temperatures encountered in operation of said engine, said shunt at temperatures below its curie point presenting a flux path across said poles to render magnetic flux ineffective upon the free end of said coil spring, said shunt being effective at temperatures above its curie point to block flow of flux therethrough to thereby render magnetic flux effective upon the free end of said coil spring to initiate engagement of said coil spring clutch.

8. In a vehicle engine cooling system, a fan for cooling said engine, an engine driven power input member, clutch means for alternately clutching said power input member to said fan and for declutching said fan from said power input member comprising a coil spring, said coil spring having one end thereof fixed to said fan for rotation therewith and the other end of said spring freely rotatable, a drive hub driven by said power input member and disposed within the coils of said spring, a fan hub rotatable with said fan and having a portion extending within the coils of said spring, a permanent magnet driven by said power input member, a pair of spaced pole rings rotatable with said magnet, a magnetic shunt extending between said pole rings and in concentric relation with said free end of said spring to provide an air gap between said shunt and the free end of said spring, said magnetic shunt being effective at temperatures below its curie point to provide a path for flux flow from one of said pole rings to the other of said pole rings to permit free rotation of said free end of said coil spring, said shunt ring being effective at temperatures above its curie point to prevent flow of flux through said shunt ring, the magnetic flux being effective upon the free end of said coil spring to clamp said free end to said pole pieces to engage said clutch when said magnetic shunt blocks the flow of flux through said shunt.

9. In a vehicle engine cooling system, a drive shaft adapted to be driven by an engine, a fan hub rotatably supported on said drive shaft, fan blades on said hub, a drive hub having a nonmagnetic friction surface driven by said drive shaft, said fan hub supported for free rotation on said drive shaft, a nonmagnetic friction surface on said fan hub, a nonmagnetic spacer driven by said drive shaft, a pair of spaced pole rings adapted to conduct magnetic flux fixed to said spacer for rotation therewith, a permanent magnet ring fixed to said pole rings, a magnetic shunt ring fixed to said pole rings, said shunt ring having a curie point falling within the range of temperature normally encountered in operation of the engine, a coil spring having the coils thereof extending around said friction surfaces and adapted to be engaged to and released from said surfaces, said coil spring having one end thereof fixed to said fan hub and a free end disposed in concentric relation to said pole rings to provide an air gap between said free end of said spring and said pole rings, said shunt being effective at temperatures below its curie point to present a flow path of magnetic flux therethrough to release said clutch, said shunt ring being effective at temperatures above said curie point to block flow of magnetic flux therethrough to render said magnetic flux effective upon said free end of said spring to engage said clutch.

10. In a vehicle engine cooling system, a fan drive shaft, an engine driven power input member supported on said drive shaft for rotation with respect thereto and adapted to be clutched to and declutched from said drive shaft, an enlarged portion on said shaft presenting an upstanding surface, an armature supported by said shaft for rotation with said shaft and axially movable with respect to said shaft, said armature presenting a surface adapted to engage said upstanding surface of said shaft when subjected to magnetic flux, a coil spring clutch having the coils thereof extending around said shaft and having one end thereof fixed to said power input member and the other end thereof fixed to said armature, means for controlling engagement and release of said coil spring clutch comprising a pair of pole rings, a permanent magnet ring and a shunt ring supported in said pole rings, said shunt ring being formed of temperature sensitive material having a curie point falling within the range of temperatures normally encountered in operation of said engine, said shunt ring being effective at temperatures below its curie point to present a flux flow path between said pole rings to release said clutch, said shunt ring being effective at temperatures above said curie point to block flow of flux therethrough to render said flux effective on said armature to engage said coil spring to said shaft.

11. In a vehicle engine cooling system, a fan drive shaft, an engine driven pulley rotatably supported on said shaft, a cone surface on said shaft, an armature supported upon said shaft freely rotatable with respect to said shaft and axially movable with respect to said shaft, a cone surface on said armature disposed adjacent said shaft cone surface to normally provide an air gap between said cone surfaces, a mounting bracket, a pair of spaced pole rings supported in said bracket, a permanent magnet ring and a shunt ring supported in said pole rings, a coil spring clutch having the coils thereof extending around said shaft and adapted to alternately grip and to be released from said shaft, said pulley being secured to one end of said spring clutch and said armature being secured to the opposite end of said coil spring clutch, said shunt ring being effective at temperatures below its curie point to shunt magnetic flux across pole rings to release said clutch, said shunt ring being effective at temperatures above its curie point to block flow of flux therethrough to render the magnetic flux effective upon said armature to engage said coil spring clutch to said shaft, said curie point of said shunt ring falling within the normal range of temperatures encountered in operation of said engine.

12. In a cooling system, a rotatable member, a fan driven by said rotatable member, a power input member, clutch means for alternately clutching said power input member to said rotatable member and declutching said power input member from said rotatable member including a pair of friction clutch members mounted for relative movement between a clutch position in friction contact with each other and a declutched position spaced from each other, means connecting a friction clutch member to said rotatable member for rotation therewith and another friction clutch member to said power input member for rotation therewith, temperature responsive means operatively connected to said clutch means for controlling relative movement of said friction clutch members between clutched and declutched positions, said means including a flux path member having high capacity for conducting magnetic flux located on one friction clutch member and a permanent magnet having a curie point above the normal range of temperature encountered in the cooling system located on the other friction clutch member and a temperature responsive magnetic shunt located on said other friction clutch member and positioned in shunt relationship to said permanent magnet bypassing said flux path member, said magnetic shunt having a curie point falling within the normal range of temperature encountered in the cooling system.

13. In a cooling system, a rotatable member, a fan driven by said rotatable member, a power input member, clutch means connected to said power input member and said rotatable member for alternately clutching said power input member to said rotatable member for the transmission of torque and for declutching said power input member from said rotatable member for interrupting the transmission of torque, a control member operatively connected to said clutch means and movable between a clutched position and a declutched position for controlling the operation of said clutch means, said clutch means including self-energizing means operative in response to movement of said control means to the clutched position to provide a self-energization for engaging said clutch, and temperature responsive magnetic means including magnetic flux path means having a curie point at a control temperature in the normal range of temperature encountered for changing the magnetic flux operatively connected to said control member for magnetically coacting with said control member for magnetically positioning said control member in said clutched position for actuating said self-energizing means for clutching said clutch means and in declutched position for declutching said clutch means.

14. The invention defined in claim 13 and said magnetic flux path means includes a magnet and a flux path member forming a shunt path bypassing said control member having a curie point at said control temperature.

References Cited by the Examiner

UNITED STATES PATENTS

| | | |
|---|---|---|
| 2,052,961 | 9/1936 | Bonham. |
| 2,214,391 | 9/1940 | Weydel. |
| 2,381,567 | 8/1945 | Bonham. |
| 3,040,856 | 6/1962 | Shoquist. |
| 3,090,548 | 5/1963 | Sargeant et al. |
| 3,197,003 | 7/1965 | Yetter _____ 192—84 |

FRANK SUSKO, *Primary Examiner.*

DAVID J. WILLLIAMOWSKY, DON A. WAITE,
*Examiners.*

B. W. WYCHE, *Assistant Examiner.*